United States Patent

Janne et al.

Patent Number: 5,704,862
Date of Patent: Jan. 6, 1998

[54] DUAL SIDED POLY-V DRIVE BELT AND PULLEY THEREFOR

[75] Inventors: Michel Leroy Janne, Raymond; Steven Mark Anderson, Lincoln, both of Nebr.

[73] Assignee: The Goodyear Tire & Rubber Company, Akron, Ohio

[21] Appl. No.: 782,389

[22] Filed: Jan. 13, 1997

[51] Int. Cl.$^6$ ............................. F16H 55/36; F16G 5/20
[52] U.S. Cl. .................... 474/168; 474/238; 474/247; 474/252
[58] Field of Search .................... 474/167, 168, 474/238, 246, 247, 251, 252

[56] References Cited

U.S. PATENT DOCUMENTS

| | | | |
|---|---|---|---|
| 3,897,291 | 7/1975 | Hoback et al. | 474/205 X |
| 4,216,679 | 8/1980 | Howerton et al. | 474/238 |
| 4,702,729 | 10/1987 | Tanaka et al. | 474/205 |
| 4,773,895 | 9/1988 | Takami et al. | 474/238 |
| 5,273,496 | 12/1993 | White | 474/238 |
| 5,334,107 | 8/1994 | White | 474/238 |
| 5,382,198 | 1/1995 | Janne | 474/205 |
| 5,415,594 | 5/1995 | Kitahama et al. | 474/263 |
| 5,447,476 | 9/1995 | White | 474/238 |
| 5,507,699 | 4/1996 | White | 474/268 |
| 5,624,338 | 4/1997 | Kawashima et al. | 474/263 |

*Primary Examiner*—Roger J. Schoeppel
*Attorney, Agent, or Firm*—Marc R. Dion, Sr.

[57] ABSTRACT

This invention relates to dual-sided multi-ribbed power transmission belts having a plurality of longitudinally extending, transversely spaced alternating ribs and grooves with the ribs having a distance between their midpoints of a pitch P on both sides of the belt. The grooves on opposite sides of the belt are transversely offset from each by a distance of P/2.

12 Claims, 3 Drawing Sheets

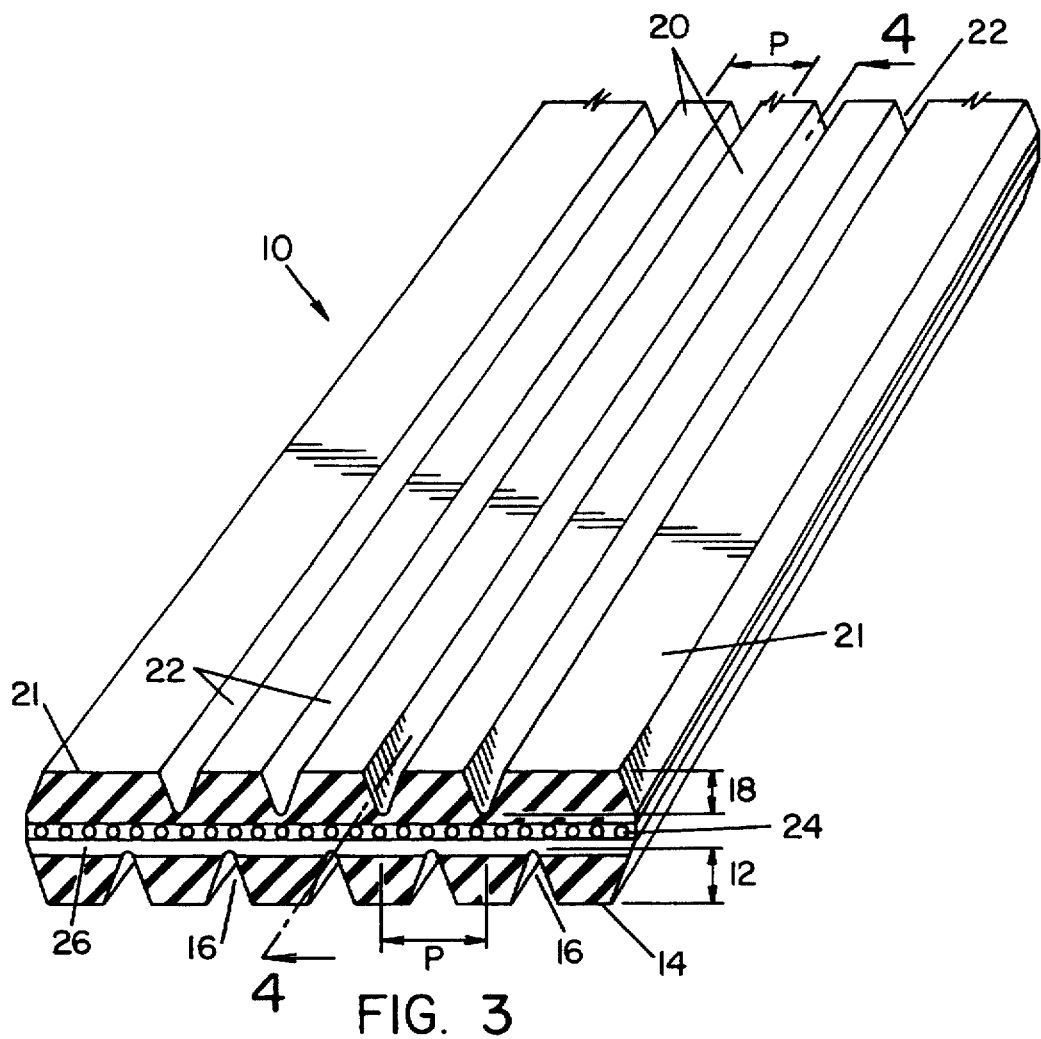
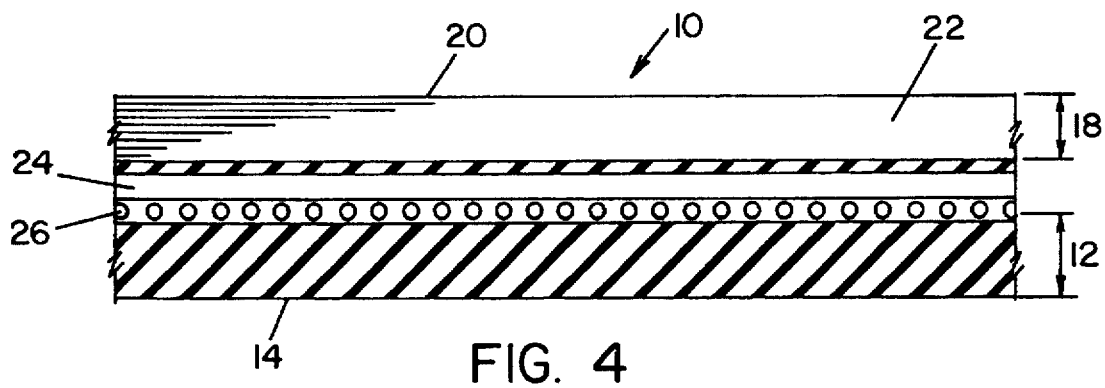

5,704,862

DUAL SIDED POLY-V DRIVE BELT AND PULLEY THEREFOR

FIELD OF THE INVENTION

This invention relates to dual-sided multi-ribbed power transmission belts.

BACKGROUND

Dual-sided multi-ribbed power transmission belts are known from the past. For example, U.S. Pat. Nos. 4,773,895 and 5,507,699. These belts illustrate ribs on each side of the tension member which either are of equal pitch with the grooves on opposite sides aligned across the tension member or are of unequal pitch. Particularly in the case of the equal pitched ribs with aligned grooves, there may be a greater tendency for the grooves to split from front to back.

SUMMARY OF THE INVENTION

In accordance with the present invention, there is provided a dual-sided, multi-ribbed power transmission belt having a primary side having a plurality of longitudinally extending, transversely spaced alternating ribs and grooves, the ribs having a distance between their midpoints of a pitch P; a secondary side having a plurality of longitudinally extending, transversely spaced alternating inner ribs and grooves, said inner ribs having a distance between their midpoints of a pitch P; a layer of longitudinally disposed tension members between the primary side and the secondary side; wherein the grooves on the secondary side are transversely offset across the tension member layer from the grooves on the primary side by a distance of P/2. There is also provided a pulley having an outer peripheral ribbed surface having a plurality of circumferentially disposed and axially alternating inner projections and land areas and a pair of outer surfaces, wherein the distance between the peaks of the inner projections is equal to a pitch P and the distance between the outermost inner projections and the outer surfaces is 1.5 P. In another embodiment of the pulley, the distance between the outermost inner projections and the outer surface is P/2. There is also provided the combination of a pulley and a belt of the invention.

BRIEF DESCRIPTION OF THE DRAWINGS

FIG. 3 is a perspective view of the secondary side of another embodiment of the belt of this invention.

FIG. 4 is a longitudinal sectional view of the belt taken along lines 4—4 of FIG. 3.

DESCRIPTION OF THE INVENTION

Figure 1:
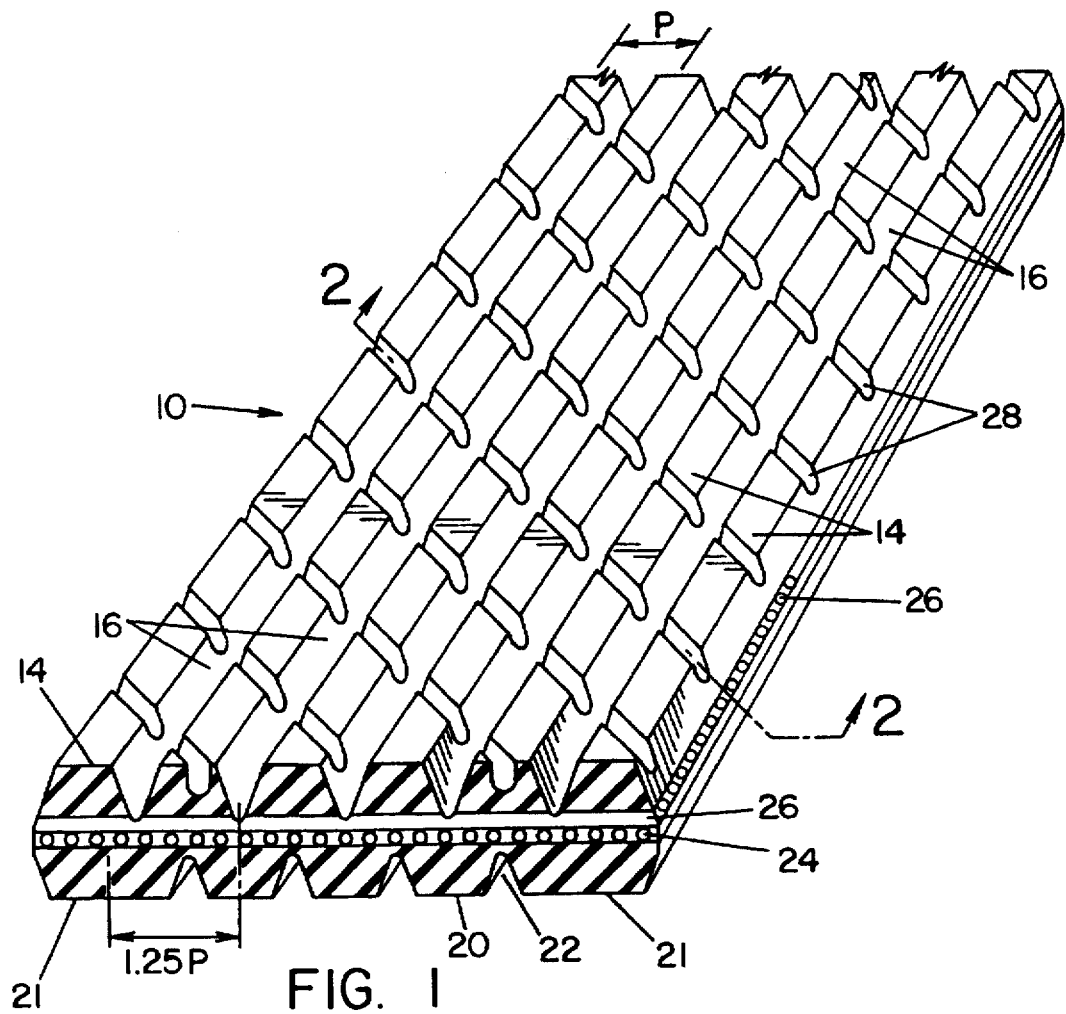
FIG. 1 is a perspective view of the primary side of one embodiment of the belt of this invention.
Figure 2:
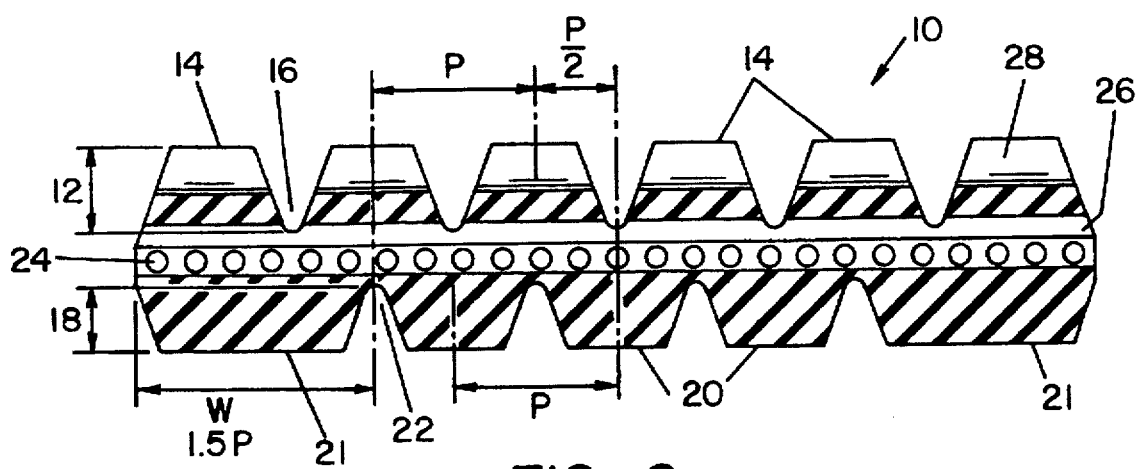
FIG. 2 is a sectional view of the belt taken along line 2—2 of FIG. 1.

FIG. 1 shows a dual-sided, multi-ribbed power transmission belt shown generally a 10. The belt has a primary side 12 and a secondary side 18. The primary side 12 has a plurality of longitudinally extending, transversely spaced alternating ribs 14 and grooves 16 with the ribs having a distance between their midpoints of a pitch P. The secondary side 18 has a plurality of longitudinally extending, transversely spaced alternating inner ribs 20 and grooves 22. The inner ribs 20 of the secondary side 18 have a distance between their midpoints of a pitch P. The belt has a layer of longitudinally disposed tension members 24 located between the primary side 12 and the secondary side 18. The grooves 22 on the secondary side 18 are transversely offset across the tension member 24 from the grooves 16 on the primary side by a distance of P/2.

The belt further has on the secondary side 18 a pair of outer ribs 21. Depending on the number of inner ribs 20 on the secondary side 18, the outer ribs 21 and have a width W equal to 1.5 P or P/2. The belt 10 further can contain a layer of transverse reinforcement 26 which can be located either between the primary side 12 and the tension member 24 or the tension member 24 and the secondary side 18. It is also contemplated that the layer of transverse reinforcement could be located on both sides of tension member 24, even though it is not illustrated.

A preferred embodiment is a belt in which there are transverse grooves 28 located on the primary side 12 which are oriented other than perpendicular to the longitudinally direction of the belt 10 such that any transverse grooves 28 in immediately adjacent longitudinal ribs 14 are offset from each other in the longitudinal direction by a distance of from 10% to 50% of the longitudinal spacing of the grooves. It is also contemplated that the transverse grooves 28 could be located on the secondary side 18. FIGS. 3 and 4 illustrate the embodiment of the belt without the transverse grooves 28.

It is further understood that the depths of the primary side grooves 16 and secondary side grooves 22 may be the same depth or may be different depths. In addition, the distances from the tensile member 24 to the primary side grooves 16 and secondary side grooves 22 may be the same or may be different.

In one preferred embodiment, the secondary side grooves 22 are shallower in depth than the primary side grooves 16 and the tensile member 24 is offset toward the secondary side grooves 22. This enables the use of smaller pulleys on the primary side 12 of the belt 10 without overstressing the secondary side 18, helping to maximize belt life. Of course, the opposite approach can be used if it is desired to use smaller pulleys on the secondary side 18.

A better understanding of the transverse grooves 28 can be found in U.S. Pat. No. 5,382,198 which description is incorporated herein by reference.

Figure 5:
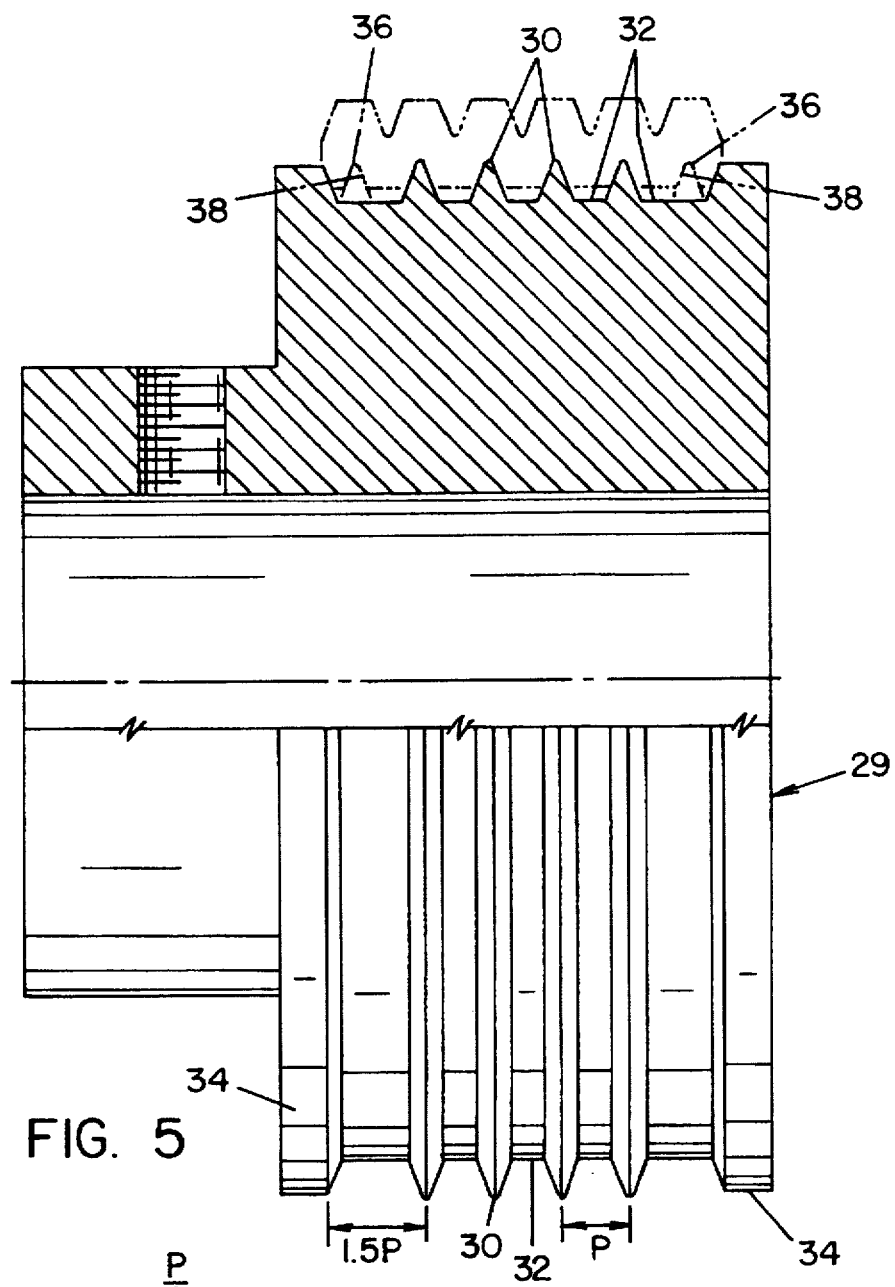
FIG. 5 is a half-sectional view of the pulley of the present invention.
Figure 6:
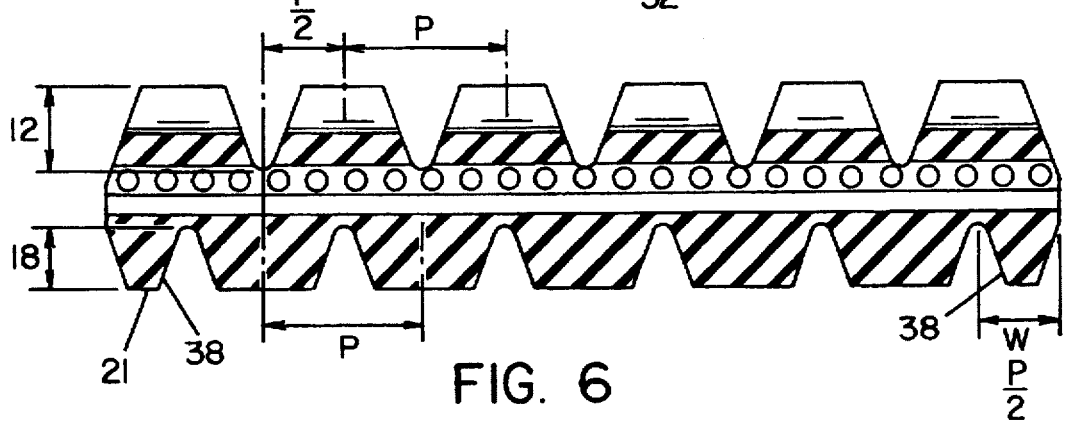
FIG. 6 is a cross-sectional view of a third embodiment of a belt of the present invention.

FIG. 5 illustrates the pulley of the present invention which complementary to the secondary side of the belt and has an outer peripheral ribbed surface having a plurality of circumferentially disposed and axially alternating inner projections 30 and land areas 32 and a pair of outer surfaces 34. The distance between the peaks of the inner projections 30 is equal to a pitch P and the distance between the outer most inner projections and the outer surfaces 34 is 1.5 P to mesh with the ribs and grooves for the embodiment of the belt illustrated in FIGS. 1–4. For use with the embodiment of the belt illustrated in FIG. 6, the pulley would have additional inner projections 36 (shown in fathom) and a smaller land area 38 between the outer projection 36 and the outer surface 34.

Pulleys for the primary side of the belt are those customarily used with existing multi-ribbed belts as specified by the SAE.

The belt of this invention is illustrated in the drawings as being elastomeric. The elastomers may be any one of those known to be suitable for use in such belts, for example, polychloroprene, polyurethane, NBR, IRR, IR, SBR, CSM, EPDM, other thermosets, thermoplastic elastomers and other polymer alloys.

The tension member layer 24 of this belt can be made of any suitable material and use any suitable technique known in the art. Preferably the tension member layer 24 is made of helically wound load carrying cords having individual turns arranged in substantially equally spaced relation across the belt body. These cords may be made from glass fiber, carbon fiber, steel, polyester, high tenacity rayon or polyaramide.

The belt of the invention need not be used with the secondary side pulley of the invention, it can also be used where the secondary side of the belt is in contact with a flat pulley.

While certain representative embodiments and details have been shown for the purpose of illustrating the invention, it will be apparent to those skilled in this art that various changes and modifications may be made therein without departing from the spirit or scope of the invention.

What is claimed is:

1. A dual-sided, multi-ribbed power transmission belt comprising a primary side having a plurality of longitudinally extending, transversely spaced alternating ribs and grooves, the ribs having a distance between their midpoints of pitch P; a secondary side having a plurality of longitudinally extending, transversely spaced alternating inner ribs and grooves, said inner ribs having a distance between their midpoints of a pitch P; a layer of longitudinally disposed tension members between the primary side and the secondary side; wherein the grooves on the secondary side are transversely offset across the tension member layer from the grooves on the primary side by a distance of P/2.

2. The belt of claim 1 further comprising on the secondary side a pair of outer ribs.

3. The belt of claim 2 wherein the outer ribs have a width W equal to 1.5 P.

4. The belt of claim 2 wherein the outer ribs have a width W equal to 0.5 P.

5. The belt according to claim 1 further comprising a layer of transverse reinforcement between the tension members and the primary side ribs.

6. The belt according to claim 1 further comprising a layer of transverse reinforcement between the tension member and the secondary side ribs.

7. The belt according to claim 1 further comprising transverse grooves on the secondary side which are oriented other than perpendicular to the longitudinal direction of the belt such that any transverse grooves in immediately adjacent longitudinal ribs are offset from each other in the longitudinal direction by a distance of from 10% to 50% of the longitudinal spacing of the grooves.

8. The belt according to claim 1 further comprising transverse grooves on the primary side which are oriented other than perpendicular to the longitudinal direction of the belt such that any transverse grooves in immediately adjacent longitudinal ribs are offset from each other in the longitudinal direction by a distance of from 10% to 50% of the longitudinal spacing of the grooves.

9. A pulley having an outer peripheral ribbed surface comprising a plurality of circumferentially disposed and axially alternating inner projections and land areas and a pair of outer surfaces, wherein the distance between the peaks of the inner projections is equal to a pitch P and the distance between the outermost inner projections and the outer surfaces is 1.5 P.

10. A pulley having an outer peripheral ribbed surface comprising a plurality of circumferentially disposed and axially alternating inner projections and land areas and a pair of outer surfaces, wherein the distance between the peaks of the inner projections is equal to a pitch P and the distance between the outermost inner projections and the outer surfaces is P/2.

11. A combination of a dual-sided multi-ribbed belt and a secondary side pulley comprising a belt having a primary side, a secondary side and a layer of longitudinally disposed tension members therebetween; wherein the primary side has a plurality of longitudinally extending, transversely spaced alternating ribs and grooves, the ribs having a width between the grooves equal to a pitch P; wherein the secondary side has a plurality of longitudinally extending, transversely spaced, alternating inner ribs and grooves, said inner ribs having a width between their midpoints equal to a pitch P; and a pair of outer ribs having widths of 1.5 P; wherein the grooves on the secondary side are transversely offset across the tension member layer from the grooves on the primary side by a distance P/2; the secondary side pulley having an outer peripheral ribbed surface comprising a plurality of circumferentially disposed and axially alternating inner projections and land areas and a pair of outer surfaces, wherein the distance between the peaks of the inner projections is equal to a pitch P and the distance between the outermost inner projections and the outer surfaces is 1.5 P.

12. A combination of a dual-sided multi-ribbed belt and a secondary side pulley comprising a belt having a primary side, a secondary side and a layer of longitudinally disposed tension members therebetween; wherein the primary side has a plurality of longitudinally extending, transversely spaced alternating ribs and grooves, the ribs having a width between the grooves equal to a pitch P; wherein the secondary side has a plurality of longitudinally extending, transversely spaced, alternating inner ribs and grooves, said inner ribs having a width between their midpoints equal to a pitch P; and a pair of outer ribs having widths of P/2; wherein the grooves on the secondary side are transversely offset across the tension member layer from the grooves on the primary side by a distance P/2; the secondary side pulley having an outer peripheral ribbed surface comprising a plurality of circumferentially disposed and axially alternating inner projections and land areas and a pair of outer surfaces, wherein the distance between the peaks of the inner projections is equal to a pitch P and the distance between the outermost inner projections and the outer surfaces is P/2.

* * * * *